United States Patent
Kumano

(10) Patent No.: US 11,453,398 B2
(45) Date of Patent: Sep. 27, 2022

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Takayasu Kumano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 145 days.

(21) Appl. No.: 16/907,395

(22) Filed: Jun. 22, 2020

(65) Prior Publication Data

US 2020/0406895 A1 Dec. 31, 2020

(30) Foreign Application Priority Data

Jun. 26, 2019 (JP) .............................. JP2019-118372

(51) Int. Cl.
  *B60W 30/18* (2012.01)
  *B60W 10/20* (2006.01)
  (Continued)

(52) U.S. Cl.
  CPC ...... *B60W 30/18163* (2013.01); *B60W 10/04* (2013.01); *B60W 10/20* (2013.01);
  (Continued)

(58) Field of Classification Search
  CPC ...... B60W 10/04; B60W 10/18; B60W 10/20; B60W 2420/42; B60W 2420/52;
  (Continued)

(56) References Cited

U.S. PATENT DOCUMENTS 10,322,720 B2 * 6/2019 Ohmura ................ B60W 40/04
10,407,061 B2 * 9/2019 Ohmura .............. B60W 30/146
(Continued)

FOREIGN PATENT DOCUMENTS

JP  2017-035927  2/2017
JP  2018-149972  9/2018
(Continued)

OTHER PUBLICATIONS

Japanese Office Action for Japanese Patent Application No. 2019-118372 dated Apr. 5, 2022.

*Primary Examiner* — Babar Sarwar
(74) *Attorney, Agent, or Firm* — Amin, Turocy & Watson, LLP

(57) ABSTRACT

A vehicle control device includes: a recognizer configured to recognize a surrounding situation of a vehicle including a predetermined object located near the vehicle; and a driving controller configure to control steering and a speed of the vehicle. The driving controller controls the speed of the vehicle such that the vehicle passes the predetermined object at a greater speed when the vehicle passes the predetermined object which is located ahead in a traveling direction of the vehicle and is moving in an opposite direction to the traveling direction of the vehicle than a speed when the vehicle passes the predetermined object which is located ahead in the traveling direction of the vehicle and is moving in the same direction as the traveling direction of the vehicle.

7 Claims, 9 Drawing Sheets

(51) Int. Cl.
  *B60W 30/14* (2006.01)
  *B60W 10/04* (2006.01)
  *B60W 10/18* (2012.01)
  *B60W 50/14* (2020.01)

(52) U.S. Cl.
  CPC .......... *B60W 30/143* (2013.01); *B60W 10/18* (2013.01); *B60W 50/14* (2013.01); *B60W 2420/42* (2013.01); *B60W 2420/52* (2013.01); *B60W 2552/45* (2020.02); *B60W 2554/4026* (2020.02); *B60W 2554/4029* (2020.02)

(58) Field of Classification Search
  CPC ......... B60W 2552/05; B60W 2552/45; B60W 2554/4026; B60W 2554/4029; B60W 2554/4044; B60W 2554/4045; B60W 2554/4049; B60W 2720/10; B60W 30/09; B60W 30/143; B60W 30/18163; B60W 50/14
  See application file for complete search history.

(56) References Cited

U.S. PATENT DOCUMENTS

| | | | |
|---|---|---|---|
| 10,640,128 B2* | 5/2020 | Hirose | G01C 21/3679 |
| 10,891,498 B2* | 1/2021 | Tsuchiya | G08G 1/165 |
| 11,077,849 B2* | 8/2021 | Matsunaga | B60W 30/0956 |
| 11,100,345 B2* | 8/2021 | Tsuchiya | G08G 1/166 |
| 2016/0272207 A1* | 9/2016 | Dolgov | B60W 30/16 |
| 2017/0043771 A1* | 2/2017 | Ibanez-Guzman | G06K 9/629 |
| 2018/0037180 A1* | 2/2018 | Narita | B60R 21/0133 |
| 2018/0056997 A1* | 3/2018 | Ohmura | B60W 10/06 |
| 2018/0065627 A1* | 3/2018 | Ohmura | B60W 10/06 |
| 2018/0178745 A1* | 6/2018 | Foltin | B60R 21/34 |
| 2018/0178784 A1* | 6/2018 | Ohta | G08G 1/166 |
| 2019/0244039 A1* | 8/2019 | Tsuchiya | G06V 20/58 |
| 2019/0263398 A1* | 8/2019 | Matsunaga | G05D 1/0246 |
| 2019/0283775 A1* | 9/2019 | Hirose | B60W 50/14 |

FOREIGN PATENT DOCUMENTS

| | | |
|---|---|---|
| JP | 2018-206036 | 12/2018 |
| JP | 2019-077291 | 5/2019 |
| WO | 2019/069425 | 4/2019 |

* cited by examiner

| $W_R$ \ $\vec{V_P}$ | OPPOSITE DIRECTION | SAME DIRECTION |
|---|---|---|
| EQUAL TO OR GREATER THAN 5 [m] | LEGAL SPEED | LEGAL SPEED ×0.9 |
| 3〜5 [m] | LEGAL SPEED ×0.9 | LEGAL SPEED ×0.6 |
| LESS THAN 3 [m] | LEGAL SPEED ×0.7 | 10 [km/h] (FIXED) |

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2019-118372, filed Jun. 26, 2019, the content of which is incorporated herein by reference.

BACKGROUND

Field of the Invention

The present invention relates to a vehicle control device, a vehicle control method, and a storage medium.

Description of Related Art

As disclosed in the related art, a device recognizes positions of people near a vehicle, whether the people are moving, orientations of the movements of the bodies, and orientations of their faces, sets a traveling region that extends by a length set in advance in front of the vehicle and has a width in accordance with a vehicle width of the vehicle, and sets first and second adjacent regions with preset widths formed on both sides of the traveling region in the vehicle width direction of the vehicle. The device determines whether the people are located in the traveling region, the first adjacent region, or the second adjacent region, determines whether the people are located within a roadway when the device determines that the people are located in the traveling region, and determines whether the orientations of the bodies of the people or the orientations of the faces of the people within the roadway are directed to the traveling region side when the people are not located in the traveling region and the people are located within the roadway. The devices determines whether or not the people are moving or whether the orientations of the movements of the people are parallel to a direction of the vehicle when the device determines that all the orientations of the bodies of the people or the orientations of the faces of the people are directed to the traveling region side and performs driving support of the vehicle based on the determination results (for example, Japanese Unexamined Patent Application, First Publication No. 2018-149972).

SUMMARY

In the technology of the related art, an aspect of the driving support is switched based on whether people (pedestrians) will cross a road. However, whether predetermined objects such as pedestrians recognize the vehicle is not considered, and the degree of deceleration is consequently insufficient or excessive in some cases.

The present invention is devised in view of such circumstances and an objective of the present invention is to provide a vehicle control device, a vehicle control method, and a storage medium capable of performing appropriate deceleration control.

A vehicle control device, a vehicle control method, and a storage medium according to the present invention adopt the following configurations.

(1) According to an aspect of the present invention, a vehicle control device includes: a recognizer configured to recognize a surrounding situation of a vehicle including a predetermined object located near the vehicle; and a driving controller configured to control steering and a speed of the vehicle. The driving controller controls the speed of the vehicle such that the vehicle passes the predetermined object at a greater speed when the vehicle passes the predetermined object which is located ahead in the traveling direction of the vehicle and is moving in an opposite direction to the traveling direction of the vehicle than a speed when the vehicle passes the predetermined object which is located ahead in the traveling direction of the vehicle and is moving in the same direction as the traveling direction of the vehicle.

(2) In the vehicle control device according to the aspect (1), the predetermined object may include one or both of a pedestrian and a bicycle.

(3) In the vehicle control device according to the aspect (1), in a case in which the recognizer recognizes that there is no sidewalk along a road on which the vehicle is located, the driving controller may control the speed of the vehicle such that the vehicle passes the predetermined object at the greater speed when the vehicle passes the predetermined object which is located ahead in the traveling direction of the vehicle and is moving in the opposite direction to the traveling direction of the vehicle than the speed when the vehicle passes the predetermined object which is located ahead in the traveling direction of the vehicle and is moving in the same direction as the traveling direction of the vehicle.

(4) In the vehicle control device according to aspects (1), in a case in which the recognizer recognizes that a width of the road on which the vehicle is located is less than a standard, the driving controller may control the speed of the vehicle such that the vehicle passes the predetermined object at the greater speed when the vehicle passes the predetermined object which is located ahead in the traveling direction of the vehicle and is moving in the opposite direction to the traveling direction of the vehicle than the speed when the vehicle passes the predetermined object which is located ahead in the traveling direction of the vehicle and is moving in the same direction as the traveling direction of the vehicle.

(5) In the vehicle control device according to the aspect (2), the predetermined object may be a pedestrian. The driving controller may control the speed of the vehicle such that the vehicle passes the predetermined object at the same speed when the recognizer recognizes that a plurality of pedestrians who are the predetermined object form a group and the vehicle passes the predetermined object which is located ahead in the traveling direction of the vehicle and is moving in the opposite direction to the traveling direction of the vehicle as the speed when the vehicle passes the predetermined object which is located ahead in the traveling direction of the vehicle and is moving in the same direction as the traveling direction of the vehicle.

(6) In the vehicle control device according to the aspect (2), the predetermined object may be a pedestrian. The driving controller may control the speed of the vehicle such that the vehicle passes the predetermined object at the same speed when the recognizer recognizes that the pedestrian who is the predetermined object shows a predetermined action and the vehicle passes the predetermined object which is located ahead in the traveling direction of the vehicle and is moving in the opposite direction to the traveling direction of the vehicle as the speed when the vehicle passes the predetermined object which is located ahead in the traveling direction of the vehicle and is moving in the same direction as the traveling direction of the vehicle.

(7) According to another aspect of the present invention, there is provided a vehicle control method causing a computer mounted in a vehicle to perform: recognizing a surrounding situation of a vehicle including a predetermined object located near the vehicle; controlling steering and a speed of the vehicle; and controlling the speed of the vehicle such that the vehicle passes the predetermined object at a greater speed when the vehicle passes the predetermined object which is located ahead in the traveling direction of the vehicle and is moving in an opposite direction to the traveling direction of the vehicle than a speed when the vehicle passes the predetermined object which is located ahead in the traveling direction of the vehicle and is moving in the same direction as the traveling direction of the vehicle.

(8) According to still another aspect of the present invention, there is provided a non-transitory computer-readable storage medium storing a program causing a computer mounted in a vehicle to perform: recognizing a surrounding situation of a vehicle including a predetermined object located near the vehicle; controlling steering and a speed of the vehicle; and controlling the speed of the vehicle such that the vehicle passes the predetermined object at a greater speed when the vehicle passes the predetermined object which is located ahead in the traveling direction of the vehicle and is moving in an opposite direction to the traveling direction of the vehicle than a speed when the vehicle passes the predetermined object which is located ahead in the traveling direction of the vehicle and is moving in the same direction as the traveling direction of the vehicle.

According to the aspects (1) to (6), it is possible to perform appropriate deceleration control.

DETAILED DESCRIPTION

Hereinafter, an embodiment of a vehicle control device, a vehicle control method, and a storage medium according to the present invention will be described with reference to the drawings.

[Overall Configuration]

Figure 1:
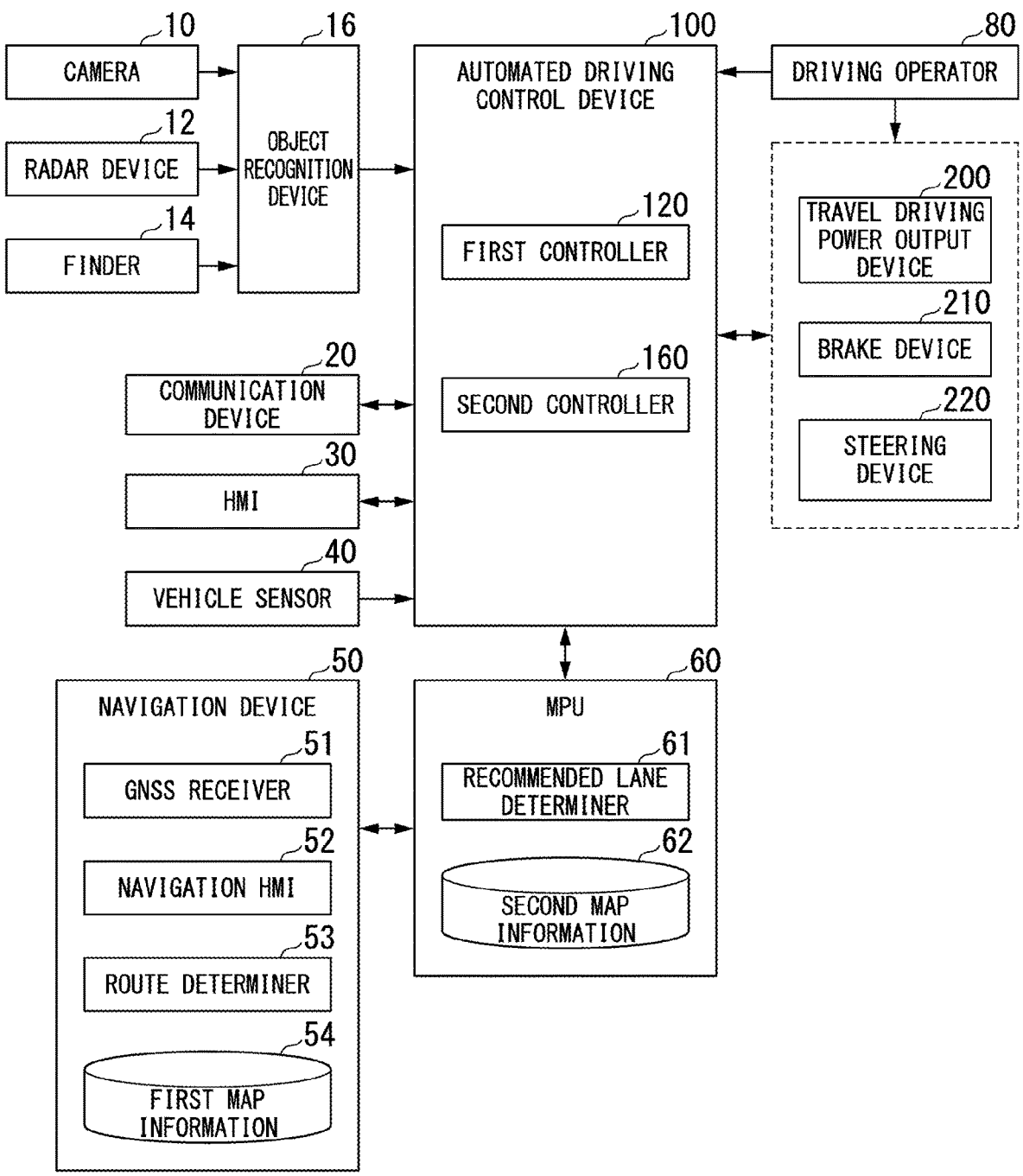
FIG. 1 is a diagram illustrating a configuration of a vehicle system in which a vehicle control device according to an embodiment is used.

FIG. 1 is a diagram illustrating a configuration of a vehicle system 1 in which a vehicle control device according to an embodiment is used. A vehicle in which the vehicle system 1 is mounted is, for example, a vehicle such as a two-wheeled vehicle, a three-wheeled vehicle, or a four-wheeled vehicle. A driving source of the vehicle includes an internal combustion engine such as a diesel engine or a gasoline engine, an electric motor, or a combination thereof. The electric motor operates using power generated by a power generator connected to the internal combustion engine or power discharged from a secondary cell or a fuel cell.

The vehicle system 1 includes, for example, a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automated driving control device 100, a travel driving power output device 200, a brake device 210, and a steering device 220. The devices and units are connected to one another via a multiplex communication line such as a controller area network (CAN) communication line, a serial communication line, or a wireless communication network. The configuration illustrated in FIG. 1 is merely exemplary, a part of the configuration may be omitted, and another configuration may be further added.

The camera 10 is, for example, a digital camera that uses a solid-state image sensor such as a charged coupled device (CCD) or a complementary metal oxide semiconductor (CMOS). The camera 10 is mounted on any portion of a vehicle in which the vehicle system 1 is mounted (hereinafter referred to as an own vehicle M). When the camera 10 performs forward imaging, the camera 10 is mounted on an upper portion of a front windshield, a rear surface of a rearview mirror, or the like. For example, the camera 10 repeatedly images the surroundings of the own vehicle M periodically. The camera 10 may be a stereo camera.

The radar device 12 radiates radio waves such as millimeter waves to the surroundings of the own vehicle M and detects radio waves (reflected waves) reflected from an object to detect at least a position (a distance from and an azimuth of) of the object. The radar device 12 is mounted on any portion of the own vehicle M. The radar device 12 may detect a position and a speed of an object in conformity with a frequency modulated continuous wave (FM-CW) scheme.

The finder 14 is a light detection and ranging (LIDAR) finder. The finder 14 radiates light to the surroundings of the own vehicle M and measures scattered light. The finder 14 detects a distance to a target based on a time from light emission to light reception. The radiated light is, for example, pulsed laser light. The finder 14 is mounted on any portion of the own vehicle M.

The object recognition device 16 performs a sensor fusion process on detection results from some or all of the camera 10, the radar device 12, and the finder 14 and recognizes a position, a type, a speed, and the like of an object. The object recognition device 16 outputs a recognition result to the automated driving control device 100. The object recognition device 16 may output detection results of the camera 10, the radar device 12, and the finder 14 to the automated driving control device 100 without any change. The object recognition device 16 may be excluded from the vehicle system 1.

The communication device 20 communicates with another vehicle near the own vehicle M using, for example, a cellular network, a Wi-Fi network, Bluetooth (registered trademark), dedicated short range communication (DSRC) or the like or communicates with various server devices via radio base stations.

The HMI 30 presents various types of information to occupants of the own vehicle M and receives input operations from the occupants. The HMI 30 includes various display devices, speakers, buzzers, touch panels, switches, and keys.

The vehicle sensor 40 includes a vehicle speed sensor that detects a speed of the own vehicle M, an acceleration sensor that detects acceleration, a yaw rate sensor that detects angular velocity around a vertical axis, and an azimuth sensor that detects a direction of the own vehicle M.

The navigation device 50 includes, for example, a global navigation satellite system (GNSS) receiver 51, a navigation HMI 52, and a route determiner 53. The navigation device 50 retains first map information 54 in a storage device such as a hard disk drive (HDD) or a flash memory. The GNSS receiver 51 specifies a position of the own vehicle M based on signals received from GNSS satellites. The position of the own vehicle M may be specified or supplemented by an inertial navigation system (INS) using an output of the vehicle sensor 40. The navigation HMI 52 includes a display device, a speaker, a touch panel, and a key. The navigation HMI 52 may be partially or entirely common to the above-described HMI 30. The route determiner 53 determines, for example, a route from a position of the own vehicle M specified by the GNSS receiver 51 (or any input position) to a destination input by an occupant using the navigation HMI 52 (hereinafter referred to as a route on a map) with reference to the first map information 54. The first map information 54 is, for example, information in which a road shape is expressed by links indicating roads and nodes connected by the links. The first map information 54 may include curvatures of roads and point of interest (POI) information. The route on the map is output to the MPU 60. The navigation device 50 may perform route guidance using the navigation HMI 52 based on the route on the map. The navigation device 50 may be realized by, for example, a function of a terminal device such as a smartphone or a tablet terminal possessed by an occupant. The navigation device 50 may transmit a present position and a destination to a navigation server via the communication device 20 to acquire the same route as the route on the map from the navigation server.

The MPU 60 includes, for example, a recommended lane determiner 61 and retains second map information 62 in a storage device such as an HDD or a flash memory. The recommended lane determiner 61 divides the route on the map provided from the navigation device 50 into a plurality of blocks (for example, divides the route in a vehicle movement direction for each 100 [m]) and determines a recommended lane for each block with reference to the second map information 62. The recommended lane determiner 61 determines in which lane the vehicle travels from the left. When there is a branching location on the route on the map, the recommended lane determiner 61 determines a recommended lane so that the own vehicle M can travel on a reasonable route to move to a branching destination.

The second map information 62 is map information that has higher precision than the first map information 54. The second map information 62 includes, for example, information regarding the middles of lanes or information regarding boundaries of lanes. The second map information 62 may include road information, traffic regulation information, address information (address and postal number), facility information, and telephone number information. The second map information 62 may be updated frequently by communicating with another device using the communication device 20.

The driving operator 80 includes, for example, an accelerator pedal, a brake pedal, a shift lever, a steering wheel, a heteromorphic steering wheel, a joystick, a turn signal lever, a microphone, and various switches. A sensor that detects whether there is an operation or an operation amount is mounted in the driving operator 80 and a detection result is output to the automated driving control device 100 or some or all of the travel driving power output device 200, the brake device 210, and the steering device 220.

The automated driving control device 100 includes, for example, a first controller 120 and a second controller 160. Each of the first controller 120 and the second controller 160 is realized, for example, by causing a hardware processor such as a central processing unit (CPU) to execute a program (software). Some or all of the constituent elements may be realized by hardware (a circuit unit including circuitry) such as a large scale integration (LSI), an application specific integrated circuit (ASIC), a field-programmable gate array (FPGA), or a graphics processing unit (GPU) or may be realized by software and hardware in cooperation. The program may be stored in advance in a storage device such as an HDD or a flash memory of the automated driving control device 100 or may be stored in a detachably mounted storage medium such as a DVD, a CD-ROM, or the like so that the storage medium (a non-transitory storage medium) is mounted on a drive device to be installed on the HDD or the flash memory of the automated driving control device 100. The automated driving control device 100 is an example of a "vehicle control device" and a combination of the action plan generator 140 and the second controller 160 is an example of a "driving controller."

Figure 2:
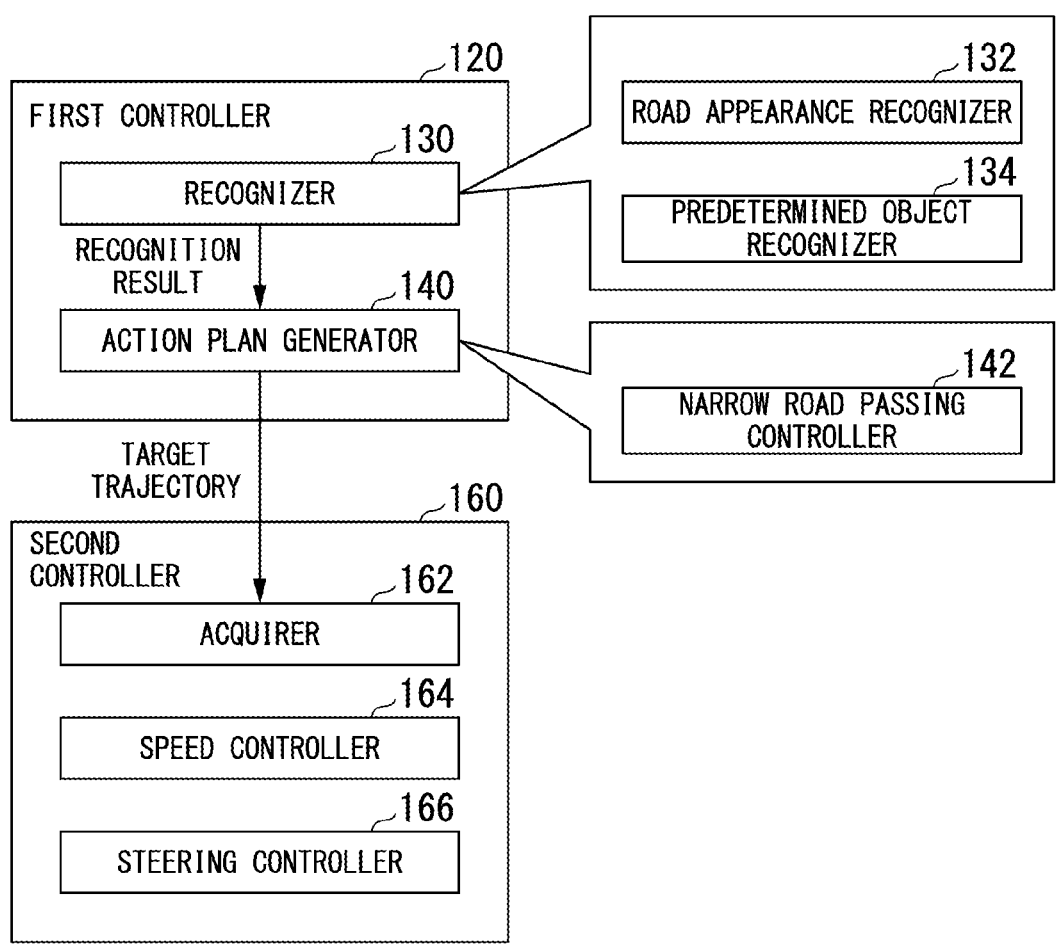
FIG. 2 is a diagram illustrating a functional configuration of a first controller and a second controller.

FIG. 2 is a diagram illustrating a functional configuration of the first controller 120 and the second controller 160. The first controller 120 includes, for example, a recognizer 130 and an action plan generator 140. The first controller 120 realizes, for example, a function by artificial intelligence (AI) and a function by a model given in advance in parallel. For example, a function of "recognizing an intersection" may be realized by performing recognition of an intersection by deep learning or the like and recognition based on a condition given in advance (a signal, a road sign, or the like which can be subjected to pattern matching) in parallel, scoring both the recognitions, and performing evaluation comprehensively. Thus, reliability of automated driving is guaranteed.

The recognizer 130 recognizes states such as a position, a speed, acceleration, or the like of an object near the own vehicle M based on information input from the camera 10, the radar device 12, and the finder 14 via the object recognition device 16. For example, the position of the object is recognized as a position on the absolute coordinates in which a representative point (a center of gravity, a center of a driving shaft, or the like) of the own vehicle M is the origin and is used for control. The position of the object may be represented as a representative point such as a center of gravity, a corner, or the like of the object or may be represented as expressed regions. A "state" of an object may include acceleration or jerk of the object or an "action state" (for example, whether a vehicle is changing lanes or is attempting to change lanes).

The recognizer 130 includes, for example, a road appearance recognizer 132 and a predetermined object recognizer 134.

The road appearance recognizer 132 recognizes, for example, an appearance of a road on which the vehicle M is located (traveling or stopped). The appearance of the road includes, for example, a road width, the number of lanes, and presence or absence of a sidewalk. For example, the road appearance recognizer 132 recognizes the appearance of the road by comparing patterns of road demarcation lines (for example, arrangement of continuous lines and broken lines) obtained from the second map information 62 with patterns of road demarcation lines around the own vehicle M recognized from images captured by the camera 10. The road appearance recognizer 132 may recognize the appearance of the road by recognizing runway boundaries (road boundaries) including road mark lines or shoulders, curbstones, median strips, and guardrails without being limited to road demarcation lines. In this recognition, the position of the own vehicle M acquired from the navigation device 50 or a process result by INS may be added.

The predetermined object recognizer 134 particularly recognizes a predetermined object among objects. The predetermined object includes, for example, one or both of a pedestrian and a bicycle. The predetermined object recognizer 134 recognizes the presence, position, speed, acceleration, and the like of a predetermined object based on the size of an object, reflection intensity of radio waves, or a result obtained by inputting images captured by the camera 10 to a learned model.

The action plan generator 140 generates a target trajectory along which the own vehicle M will automatedly (irrespective of an operation or the like performed by a driver) travel in the future so that the own vehicle M is traveling in a recommended lane determined by the recommended lane determiner 61 and can handle a surrounding situation of the own vehicle M in principle. The target trajectory includes, for example, a speed component. For example, the target trajectory is expressed by arranging spots (trajectory points) at which the own vehicle M will arrive in sequence. The trajectory points are spots at which the own vehicle M will arrive after each predetermined travel distance (for example, about several [m]) in a distance along a road. Apart from the trajectory points, target acceleration and a target speed are generated as parts of the target trajectory for each of predetermined sampling times (for example, every several tenths of a second). The trajectory point may be a position at which the own vehicle M will arrive at each predetermined sampling time. In this case, information regarding the target acceleration or the target speed is expressed according to an interval between the trajectory points.

The action plan generator 140 may set an automated driving event when the target trajectory is generated. As the automated driving event, there are a constant speed traveling event, a low-speed following traveling event, a lane changing event, a branching event, a joining event, a takeover event, and the like. The action plan generator 140 generates the target trajectory in accordance with an activated event.

The action plan generator 140 includes, for example, a narrow road passing controller 142. The narrow road passing controller 142 will be described later.

The second controller 160 controls the travel driving power output device 200, the brake device 210, and the steering device 220 so that the own vehicle M passes along the target trajectory generated by the action plan generator 140 at a scheduled time.

Referring back to FIG. 2, the second controller 160 includes, for example, an acquirer 162, a speed controller 164, and a steering controller 166. The acquirer 162 acquires information regarding a target trajectory (trajectory points) generated by the action plan generator 140 and stores the information in a memory (not illustrated). The speed controller 164 controls the travel driving power output device 200 or the brake device 210 based on a speed element incidental to the target trajectory stored in the memory. The steering controller 166 controls the steering device 220 in accordance with a curve state of the target trajectory stored in the memory. Processes of the speed controller 164 and the steering controller 166 are realized, for example, by combining feed-forward control and feedback control. For example, the steering controller 166 performs the feed-forward control in accordance with a curvature of a road in front of the own vehicle M and the feedback control based on separation from the target trajectory in combination.

The travel driving power output device 200 outputs a travel driving power (torque) for causing the own vehicle M to travel to a driving wheel. The travel driving power output device 200 includes, for example, a combination of an internal combustion engine, an electric motor, and a transmission and an electronic control unit (ECU) controlling them. The ECU controls the foregoing configuration in accordance with information input from the second controller 160 or information input from the driving operator 80.

The brake device 210 includes, for example, a brake caliper, a cylinder that transmits a hydraulic pressure to the brake caliper, an electric motor that generates a hydraulic pressure to the cylinder, and a brake ECU. The brake ECU controls the electric motor in accordance with information input from the second controller 160 or information input from the driving operator 80 such that a brake torque in accordance with a brake operation is output to each wheel. The brake device 210 may include a mechanism that transmits a hydraulic pressure generated in response to an operation of the brake pedal included in the driving operator 80 to the cylinder via a master cylinder as a backup. The brake device 210 is not limited to the above-described configuration and may be an electronic control type hydraulic brake device that controls an actuator in accordance with information input from the second controller 160 such that a hydraulic pressure of the master cylinder is transmitted to the cylinder.

The steering device 220 includes, for example, a steering ECU and an electric motor. The electric motor applies a force to, for example, a rack and pinion mechanism to change a direction of a steering wheel. The steering ECU drives the electric motor to change the direction of the steering wheel in accordance with information input from the second controller 160 or information input from the driving operator 80.

[Passing Control]

Hereinafter, control by the narrow road passing controller 142 will be described. The narrow road passing controller 142 operates, for example, when the road appearance recognizer 132 recognizes that there is no sidewalk along a road on which the own vehicle M is located and the width of the road on which the own vehicle M is located is less than a predetermined distance (less than a standard) and when the predetermined object recognizer 134 recognizes that a predetermined object is located ahead in a traveling direction of the own vehicle M. Instead of this, the narrow road passing controller 142 may operate when the road appearance recognizer 132 recognizes that there is no sidewalk along the road on which the own vehicle M is located and the predetermined object recognizer 134 recognizes the predetermined object. The narrow road passing controller 142 may operate when the road appearance recognizer 132 recognizes that the width of the road on which the own vehicle M is located is less than the predetermined distance and the predetermined object recognizer 134 recognizes the predetermined object.

Figure 3:
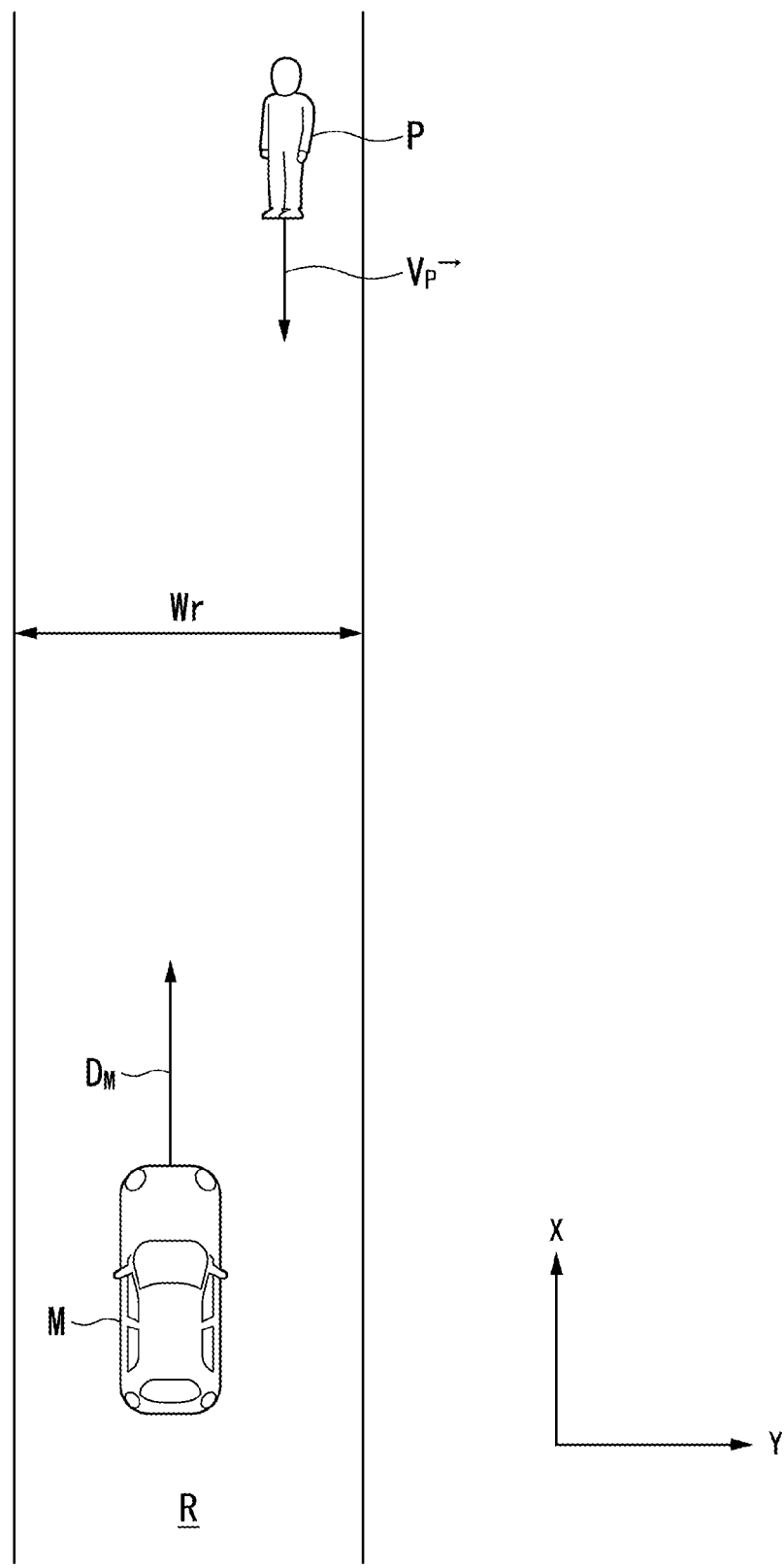
FIG. 3 is a diagram illustrating an example of a scenario in which a pedestrian who is a predetermined object is recognized on a road which has a width less than a predetermined distance and along which there is no sidewalk.

FIG. 3 is a diagram illustrating an example of a scenario in which a pedestrian who is a predetermined object is recognized on a road which has a width less than a predetermined distance and along which there is no sidewalk. In the drawing, $D_M$ denotes a traveling direction of the own vehicle M and Wr denotes a width of a road R. $V_P^{\rightarrow}$ denotes a velocity vector of a pedestrian P (a vector is represented by a superscript arrow). The velocity vector $V_P^{\rightarrow}$ is recognized by the predetermined object recognizer 134.

In this scenario, the narrow road passing controller 142 performs slow driving to pass the pedestrian P. Here, the narrow road passing controller 142 causes the degree of deceleration to be different between when the pedestrian P is moving in an opposite direction to the traveling direction of the own vehicle M (that is, when the pedestrian P is headed toward the own vehicle M) and when the pedestrian P is moving in the same direction as the moving direction of the own vehicle M. The narrow road passing controller 142 controls a speed of the own vehicle M such that the own vehicle M passes the pedestrian P at a greater speed than a speed if the pedestrian P were moving in the same direction as the traveling direction of the own vehicle M when the pedestrian P is moving in the opposite direction to the traveling direction of the own vehicle M.

This control is based on the thought that, when the pedestrian P is moving in the opposite direction to the traveling direction of the own vehicle M, the own vehicle M is located in front of the visual line of the pedestrian P and the pedestrian P is highly likely to recognize the presence of the own vehicle M, and there is a low probability of the pedestrian P being frightened when the own vehicle M passes the pedestrian P at a certain speed. In contrast, when the pedestrian P is moving in the same direction as the traveling direction of the own vehicle M, it is thought that the own vehicle M is not located in front of the visual line of the pedestrian P and the pedestrian P is less likely to recognize the presence of the own vehicle M, and there is a high probability of the pedestrian P being frightened if the own vehicle M does not sufficiently decelerate before passing the pedestrian P. More specifically, a direction or the like of the visual line of the pedestrian P can be considered to be recognized from images captured by the camera 10. However, due to imaging conditions (ambient illuminance, weather, the degree of opening of the eyes of the pedestrian P, and the like) of the camera 10, recognition precision of the captured images, and the like, the direction of the visual line of the pedestrian P cannot be recognized with sufficient precision in some cases and there is concern of the own vehicle M being unable to be controlled with stable precision. Accordingly, by controlling deceleration based on a movement direction which is relatively easy to recognize, it is possible to perform appropriate deceleration control stably.

Figures 4, 5:
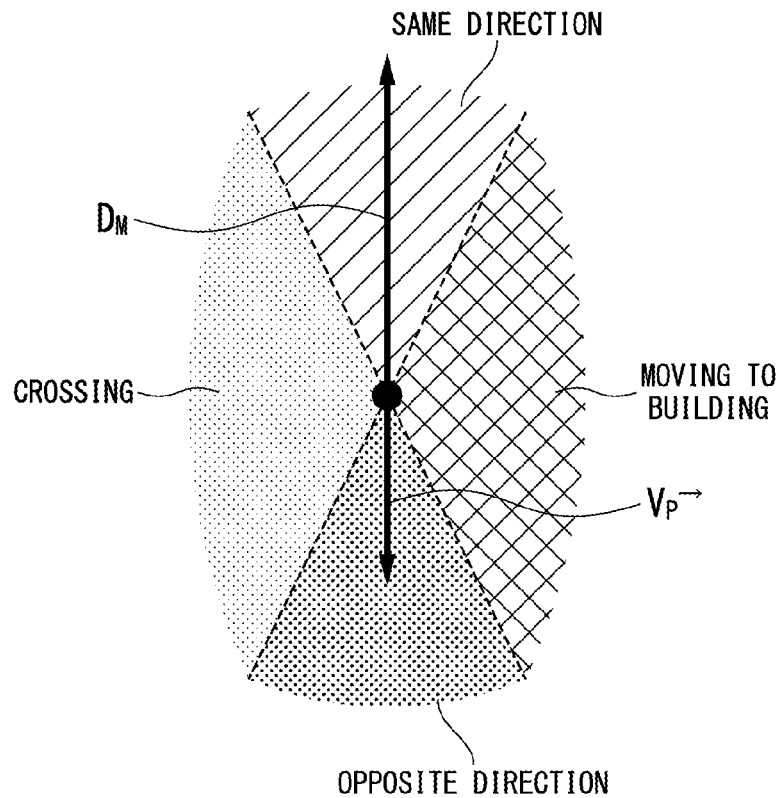
FIG. 4 is a diagram illustrating rules for determining walking of a pedestrian who is moving.
FIG. 5 is a diagram illustrating examples of speed control rules at the time of passing.

FIG. 4 is a diagram illustrating rules for determining walking of the pedestrian P who is moving. For example, the narrow road passing controller 142 determines that the pedestrian P is headed in an "opposite direction" when the direction of the velocity vector $V_P^{\rightarrow}$ is within a predetermined angle range (for example, a range of ±15 degrees) centered on a direction of 180 degrees in the traveling direction $D_M$ of the own vehicle M. The narrow road passing controller 142 determines that the pedestrian P is headed in the "same direction" when the direction of the velocity vector $V_P^{\rightarrow}$ is within a predetermined angle range (for example, a range of ±15 degrees) centered on a direction of 0 degrees in the traveling direction $D_M$ of the own vehicle M. The narrow road passing controller 142 determines that the pedestrian P is "crossing" when the direction of the velocity vector $V_P^{\rightarrow}$ is within a predetermined angle range (for example, a range of ±75 degrees) centered on a direction of 90 degrees or 270 degrees (a direction opposite to a biased side on the assumption that the pedestrian P is walking with bias toward either side of the road R) in the traveling direction $D_M$ of the own vehicle M. The narrow road passing controller 142 determines that the pedestrian P is "moving to a building" in other cases. The narrow road passing controller 142 may treat a direction which is a longitudinal direction of the road R and a direction matching the traveling direction of the own vehicle M as the traveling direction $D_M$ of the own vehicle M.

FIG. 5 is a diagram illustrating examples of speed control rules at the time of passing. For example, the narrow road passing controller 142 controls a speed of the own vehicle M so that the own vehicle M passes the pedestrian P at a legal speed when the width Wr of the road R is equal to or greater than 5 [m] and the velocity vector $V_P^{\rightarrow}$ of the pedestrian P is in the opposite direction to the traveling direction $D_M$ of the own vehicle M. The narrow road passing controller 142 controls the speed of the own vehicle M so that the own vehicle M passes the pedestrian P at a speed obtained by multiplying the legal speed by a coefficient of about 0.9 when the velocity vector $V_P^{\rightarrow}$ of the pedestrian P is in the same direction as the traveling direction $D_M$ of the own vehicle M. The narrow road passing controller 142 controls the speed of the own vehicle M so that the own vehicle M passes the pedestrian P at a speed obtained by multiplying the legal speed by a coefficient of about 0.9 when the width Wr of the road R is equal to or greater than 3 [m] and less than 5 [m] and the velocity vector $V_P^{\rightarrow}$ of the pedestrian P is in the opposite direction to the traveling direction $D_M$ of the own vehicle M. The narrow road passing controller 142 controls the speed of the own vehicle M so that the own vehicle M passes the pedestrian P at a speed obtained by multiplying the legal speed by a coefficient of about 0.6 when the velocity vector $V_P^{\rightarrow}$ of the pedestrian P is in the same direction as the traveling direction $D_M$ of the own vehicle M. The narrow road passing controller 142 controls the speed of the own vehicle M so that the own vehicle M passes the pedestrian P at a speed obtained by multiplying the legal speed by a coefficient of about 0.7 when the width Wr of the road R is less than 3 [m] and the velocity vector $V_P^{\rightarrow}$ of the pedestrian P is in the opposite direction to the traveling direction $D_M$ of the own vehicle M. The narrow road passing controller 142 controls the speed of the own vehicle M so that the own vehicle M passes the pedestrian P at a sufficiently low fixed speed of about 10 [km/h] when the velocity vector $V_P^{\rightarrow}$ of the pedestrian P is in the same direction as the traveling direction $D_M$ of the own vehicle M.

[Exceptions]

In the case of the following exceptional events, the narrow road passing controller 142 controls a speed of the own vehicle M so that the own vehicle M passes the pedestrian P at the same speed as a speed in the case of the same direction even when the velocity vector $V_P^{\rightarrow}$ of the pedestrian P is in the opposite direction to the traveling direction $D_M$ of the own vehicle M.

[Exceptional Event 1]

Figure 6:
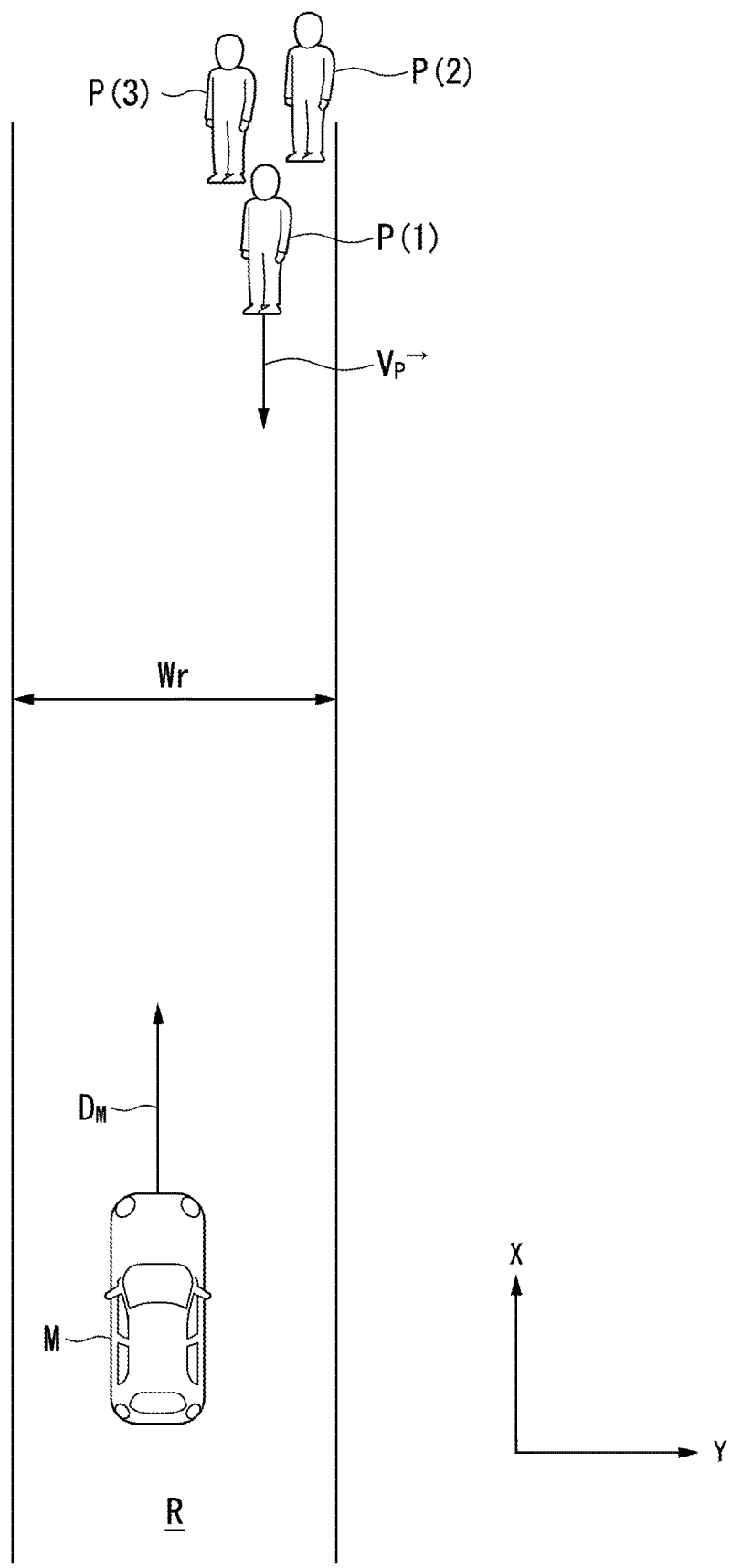
FIG. 6 is a diagram illustrating a scenario in which exceptional event 1 occurs.

In a case in which the predetermined object recognizer 134 recognizes that a plurality of pedestrians P who are a predetermined object form a group, the narrow road passing controller 142 controls the speed of the own vehicle M so that the own vehicle M passes the group of pedestrians P at the same speed as a speed in the case of the same direction even when the velocity vector $V_P^{\rightarrow}$ (in this case, an average of velocity vectors of the pedestrians P or a velocity vector of the pedestrian P walking at the head of the group) of the pedestrians P is in the opposite direction to the traveling direction $D_M$ of the own vehicle M. FIG. 6 is a diagram illustrating a scenario in which exceptional event 1 occurs. "Form a group" means that, for example, two or more pedestrians P are moving in substantially the same direction (for example, within a range of ±10 degrees) in a state in which a distance from a closest pedestrian is less than a standard distance. In such a scenario, this is because the pedestrians P are actively talking, orient their visual lines in other directions, or abruptly start irregular movement even when all the pedestrians P are moving toward the own vehicle M.

[Exceptional Event 2]

Figure 7:
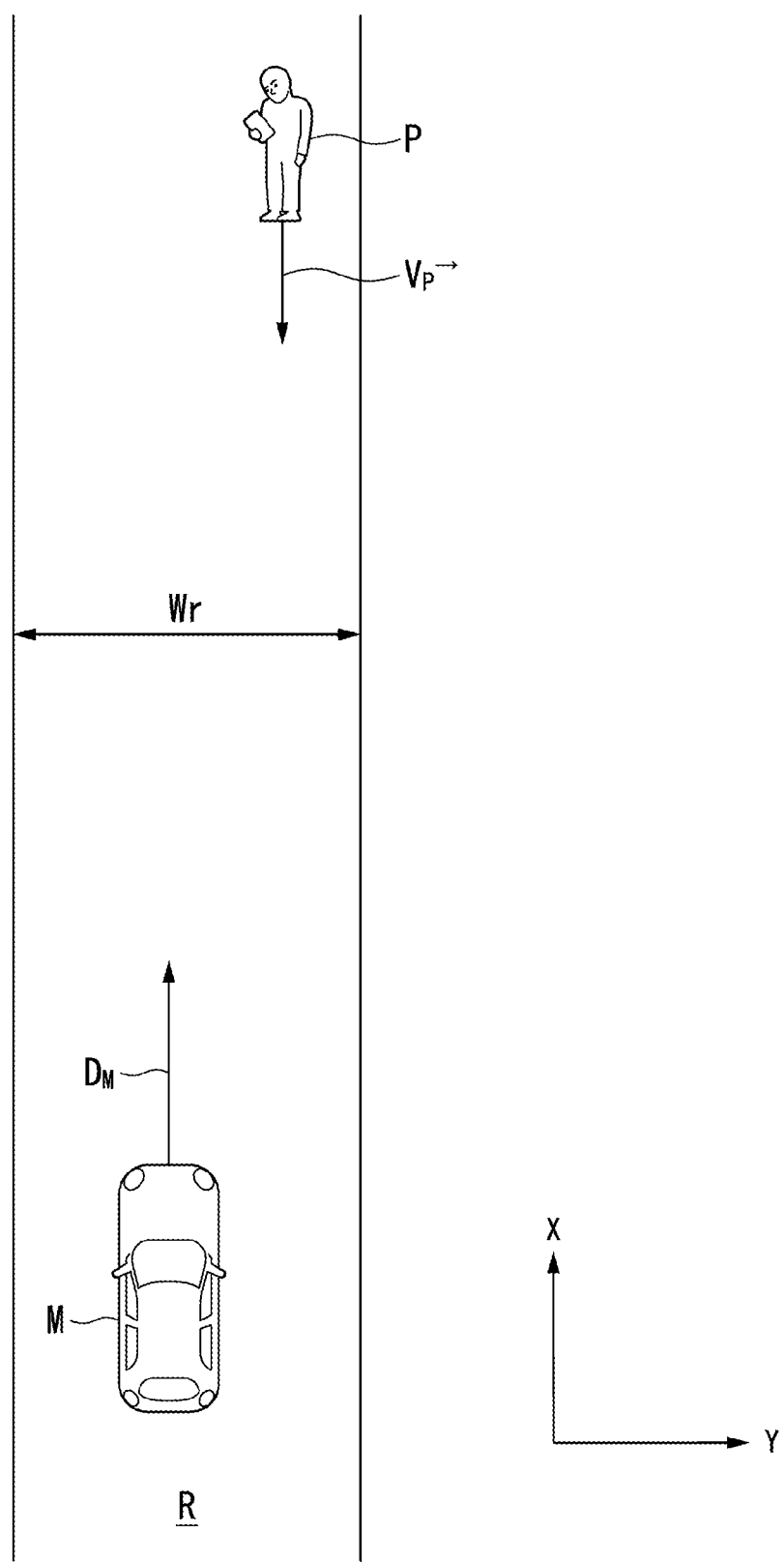
FIG. 7 is a diagram illustrating a scenario in which exceptional event 2 occurs.

In a case in which the predetermined object recognizer 134 recognizes that the pedestrians P who are a predetermined object show a predetermined action, the narrow road passing controller 142 controls a speed of the own vehicle M so that the own vehicle M passes the group of pedestrians P at the same speed as a speed in the case of the same direction even when the velocity vector $V_P^{\rightarrow}$ of the pedestrians P is in the opposite direction to the traveling direction $D_M$ of the own vehicle M. The predetermined action is, for example, an action of operating a terminal device (a smartphone or a tablet terminal) held in one's hand with one's head facing downwards. FIG. 7 is a diagram illustrating a scenario in which exceptional event 2 occurs. In such a scenario, this is because the pedestrian P is not highly likely to recognize the own vehicle M even when the pedestrian P is moving toward the own vehicle M.

[Process Flow]

Figure 8:
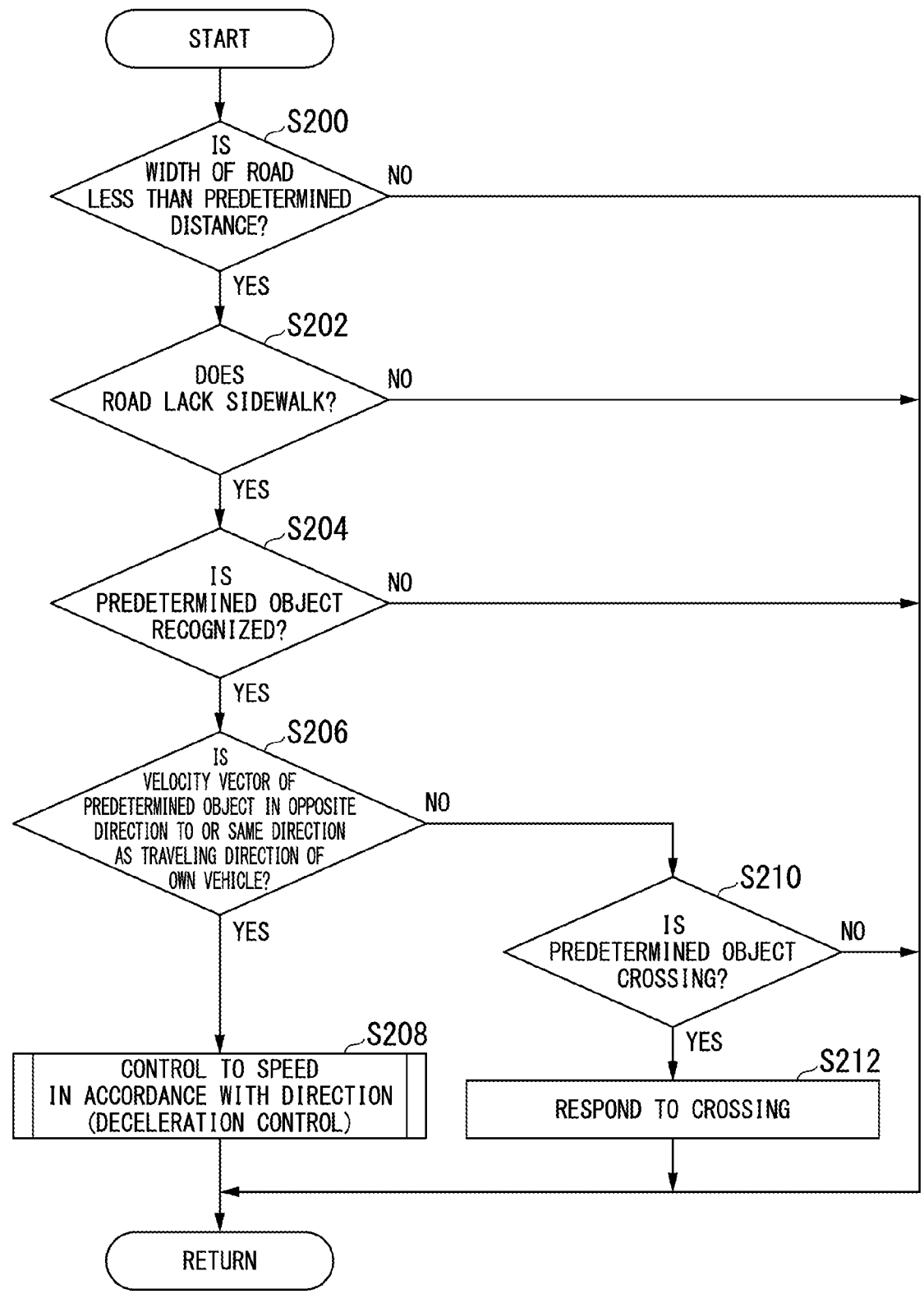
FIG. 8 is a flowchart illustrating an example of a flow of processes performed by an automated driving control device according to an embodiment.
Figure 9:
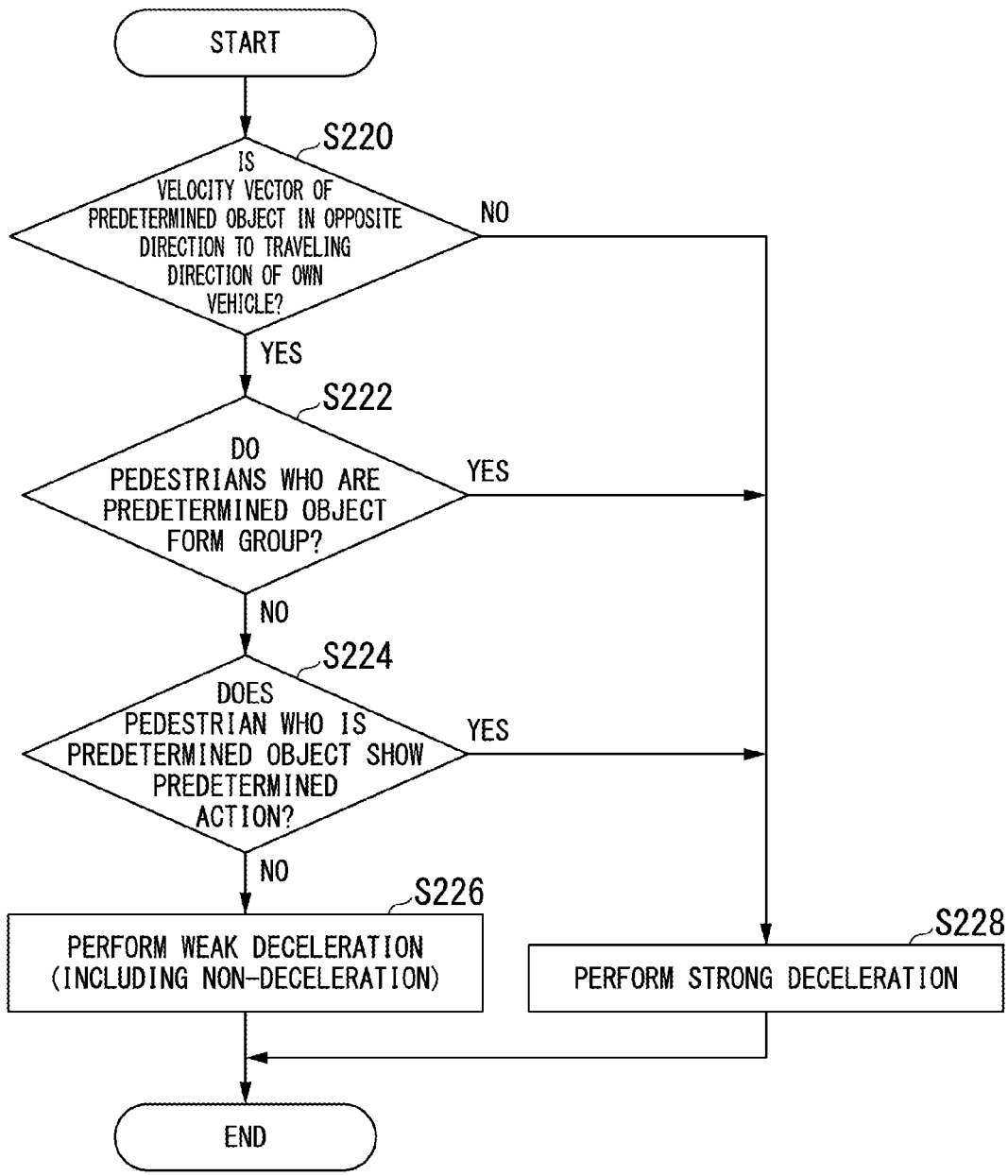
FIG. 9 is a flowchart illustrating an example of a flow of processes performed by an automated driving control device according to an embodiment.

FIGS. 8 and 9 are flowcharts illustrating an example of a flow of processes performed by the automated driving control device 100 according to an embodiment. First, the road appearance recognizer 132 determines whether the width of a road on which the own vehicle M is located is less than a predetermined distance (step S200). When the determination result is positive, it is determined whether or not there is a sidewalk along the road on which the own vehicle M is located (step S202). When the road appearance recognizer 132 determines that the width of a road on which the own vehicle M is located is equal to or greater than the predetermined distance or determines that there is a sidewalk along the road on which the own vehicle M is located, the process of one route of the flowchart ends. The predetermined distance in step S200 is set to, for example, about 6 to 7 [m] when the rules of FIG. 5 are used.

When the road appearance recognizer 132 determines that the width of the road on which the own vehicle M is located is equal to or greater than the predetermined distance and determines that there is no sidewalk along the road on which the own vehicle M is located, the predetermined object recognizer 134 determines whether a predetermined object is recognized ahead in the traveling direction of the own vehicle M (step S204). When a predetermined object is not recognized ahead in the traveling direction of the own vehicle M, the process of one routine of the flowchart ends.

When a predetermined object is recognized ahead in the traveling direction of the own vehicle M, the narrow road passing controller 142 determines whether the velocity vector of the predetermined object is in the opposite direction to or the same direction as the traveling direction of the own vehicle M (step S206: see FIG. 4). When it is determined that the velocity vector of the predetermined object is in the opposite direction to or the same direction as the traveling direction of the own vehicle M, the speed of the own vehicle M is controlled to a speed in accordance with the direction of the velocity vector of the predetermined object (step S208). Content of the process of step S208 will be described with reference to FIG. 9.

When the narrow road passing controller 142 determines that the velocity vector of the predetermined object is not in the opposite direction to or the same direction as the traveling direction of the own vehicle M, the narrow road passing controller 142 determines whether the predetermined object is crossing (step S210: see FIG. 4). When the narrow road passing controller 142 determines that the predetermined object is crossing, the action plan generator 140 performs control corresponding to the crossing of the predetermined object (step S212). The control corresponding to the crossing is, for example, control in which the own vehicle M decelerates or stops so that a future position of the predetermined object and a future position of the own vehicle M do not interfere with each other. Since this is not the core of the present invention, detailed description thereof will be omitted.

The process proceeds to FIG. 9. The narrow road passing controller 142 determines whether the velocity vector of the predetermined object is in the opposite direction to or the same direction as the traveling direction of the own vehicle M when the narrow road passing controller 142 determines that the velocity vector of the predetermined object is in the opposite direction to or the same direction as the traveling direction of the own vehicle M (step S220). When the narrow road passing controller 142 determines that the velocity vector of the predetermined object is not in the opposite direction to the traveling direction of the own vehicle M, that is, is in the same direction, the narrow road passing controller 142 controls the speed of the own vehicle M such that strong deceleration is performed (step S228: see FIG. 5).

When the narrow road passing controller 142 determines that the velocity vector of the predetermined object is in the opposite direction to the traveling direction of the own vehicle M, the narrow road passing controller 142 determines whether the pedestrians who are a predetermined object form a group (step S222). When the narrow road passing controller 142 determines that the pedestrians who are a predetermined object do not form a group, the narrow road passing controller 142 determines whether the pedestrian who is a predetermined object shows a predetermined action (step S224). When a determination result is positive in either step S222 or step S224, the narrow road passing controller 142 controls the speed of the own vehicle M such that the strong deceleration is performed (step S228: see FIG. 5). Conversely, when the determination result is negative in both step S222 and step S224, the narrow road passing controller 142 controls the speed of the own vehicle M such that weak deceleration (including non-deceleration) is performed (step S226: see FIG. 5).

The automated driving control device 100 according to the above-described embodiment includes the recognizer 130 that recognizes a surrounding situation of the own vehicle M including a predetermined object located near the own vehicle M; and a driving controller (140 or 160) configured to control steering and a speed of the own vehicle M. The driving controller controls the speed of the own vehicle M such that the own vehicle M passes the predetermined object at a greater speed when the own vehicle M passes the predetermined object which is located ahead in a traveling direction of the own vehicle M and is moving in an opposite direction to the traveling direction of the own vehicle M than a speed when the own vehicle M passes the predetermined object which is located ahead in the traveling direction of the own vehicle M and is moving in the same direction as the traveling direction of the own vehicle M. Therefore, it is possible to perform the appropriate deceleration control.

[Hardware Configuration]

Figure 10:
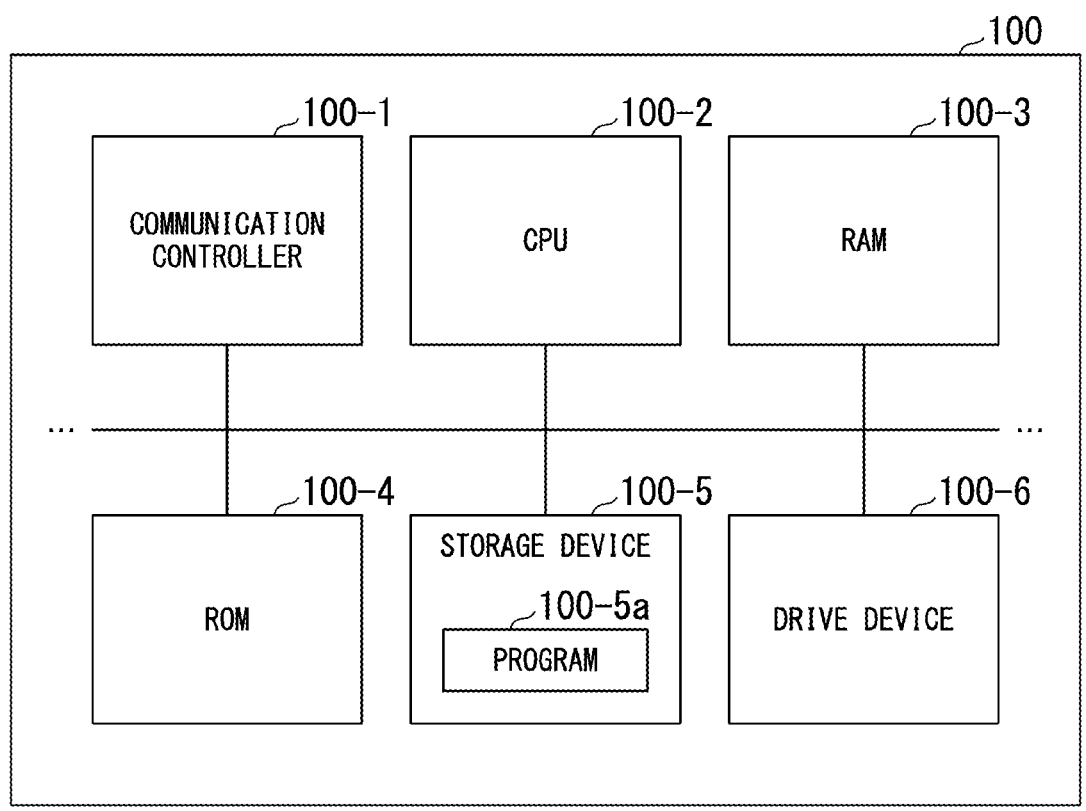
FIG. 10 is a diagram illustrating an example of a hardware configuration of the automated driving control device according to an embodiment.

FIG. 10 is a diagram illustrating an example of a hardware configuration of the automated driving control device 100 according to an embodiment. As illustrated, the automated driving control device 100 is configured such that a communication controller 100-1, a CPU 100-2, a random access memory (RAM) 100-3 that is used as a working memory, a read-only memory (ROM) 100-4 that stores a boot program or the like, a storage device 100-5 such as a flash memory or a hard disk drive (HDD), a drive device 100-6, and the like are connected to each other via an internal bus or a dedicated communication line. The communication controller 100-1 performs communication with constituent elements other than the automated driving control device 100. The storage device 100-5 stores a program 100-5a that is executed by the CPU 100-2. The program is loaded on the RAM 100-3 by a direct memory access (DMA) controller (not illustrated) to be executed by the CPU 100-2. Thus, some or all of the recognizer 130, the action plan generator 140, and the second controller 160 are realized.

The above-described embodiment can be expressed as follows:

a vehicle control device including a storage device that stores a program and a hardware processor, the hardware processor executing the program stored in the storage device to perform:

recognizing a surrounding situation of a vehicle including a predetermined object located near the vehicle;

controlling steering and a speed of the vehicle; and controlling the speed of the vehicle such that the vehicle passes the predetermined object at a greater speed when the vehicle passes the predetermined object which is located ahead in a traveling direction of the vehicle and is moving in an opposite direction to the traveling direction of the vehicle than a speed when the vehicle passes the predetermined object which is located ahead in the traveling direction of the vehicle and is moving in the same direction as the traveling direction of the vehicle.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising a storage device that stores a program and a processor, the processor executing the program stored in the storage device to:

recognize a surrounding situation of a vehicle including a predetermined object located near the vehicle; and control steering and a speed of the vehicle, wherein, when the processor has recognized that there is no sidewalk along a road on which the vehicle is located, the processor controls the speed of the vehicle such that the vehicle passes the predetermined object at a greater speed when the vehicle passes the predetermined object which is located ahead in a traveling direction of the vehicle and is moving in an opposite direction to the traveling direction of the vehicle than a speed when the vehicle passes the predetermined object which is located ahead in the traveling direction of the vehicle and is moving in the same direction as the traveling direction of the vehicle.

2. The vehicle control device according to claim 1, wherein the predetermined object includes one or both of a pedestrian and a bicycle.

3. The vehicle control device according to claim 1, wherein, in a case in which the processor recognizes that a width of the road on which the vehicle is located is less than a standard, the processor controls the speed of the vehicle such that the vehicle passes the predetermined object at the greater speed when the vehicle passes the predetermined object which is located ahead in the traveling direction of the vehicle and is moving in the opposite direction to the traveling direction of the vehicle than the speed when the vehicle passes the predetermined object which is located ahead in the traveling direction of the vehicle and is moving in the same direction as the traveling direction of the vehicle.

4. The vehicle control device according to claim 1, wherein the predetermined object is a pedestrian, and wherein the processor controls the speed of the vehicle such that the vehicle passes the predetermined object at the same speed when the processor recognizes that a plurality of pedestrians who are the predetermined object form a group and the vehicle passes the predetermined object which is located ahead in the traveling direction of the vehicle and is moving in the opposite direction to the traveling direction of the vehicle as the speed when the vehicle passes the predetermined object which is located ahead in the traveling direction of the vehicle and is moving in the same direction as the traveling direction of the vehicle.

5. The vehicle control device according to claim 1, wherein the predetermined object is a pedestrian, and wherein the processor controls the speed of the vehicle such that the vehicle passes the predetermined object at the same speed when the processor recognizes that the pedestrian who is the predetermined object shows a predetermined action and the vehicle passes the predetermined object which is located ahead in the traveling direction of the vehicle and is moving in the opposite direction to the traveling direction of the vehicle as the speed when the vehicle passes the predetermined object which is located ahead in the traveling direction of the vehicle and is moving in the same direction as the traveling direction of the vehicle.

6. A vehicle control method causing a computer mounted in a vehicle to perform:

recognizing a surrounding situation of the vehicle including a predetermined object located near the vehicle;

controlling steering and a speed of the vehicle; and based on determining that there is no sidewalk along a road on which the vehicle is located, controlling the speed of the vehicle such that the vehicle passes the predetermined object at a greater speed when the vehicle passes the predetermined object which is located ahead in a traveling direction of the vehicle and is moving in an opposite direction to the traveling direction of the vehicle than a speed when the vehicle passes the predetermined object which is located ahead in the traveling direction of the vehicle and is moving in the same direction as the traveling direction of the vehicle.

7. A non-transitory computer-readable storage medium storing a program causing a computer mounted in a vehicle to perform:

recognizing a surrounding situation of the vehicle including a predetermined object located near the vehicle;

controlling steering and a speed of the vehicle; and based on a determination that there is no sidewalk along a road on which the vehicle is located, controlling the speed of the vehicle such that the vehicle passes the predetermined object at a greater speed when the vehicle passes the predetermined object which is located ahead in a traveling direction of the vehicle and is moving in an opposite direction to the traveling direction of the vehicle than a speed when the vehicle passes the predetermined object which is located ahead in the traveling direction of the vehicle and is moving in the same direction as the traveling direction of the vehicle.

* * * * *